Dec. 23, 1952 A. H. SMITH 2,622,643
NUTCRACKER
Filed May 16, 1949
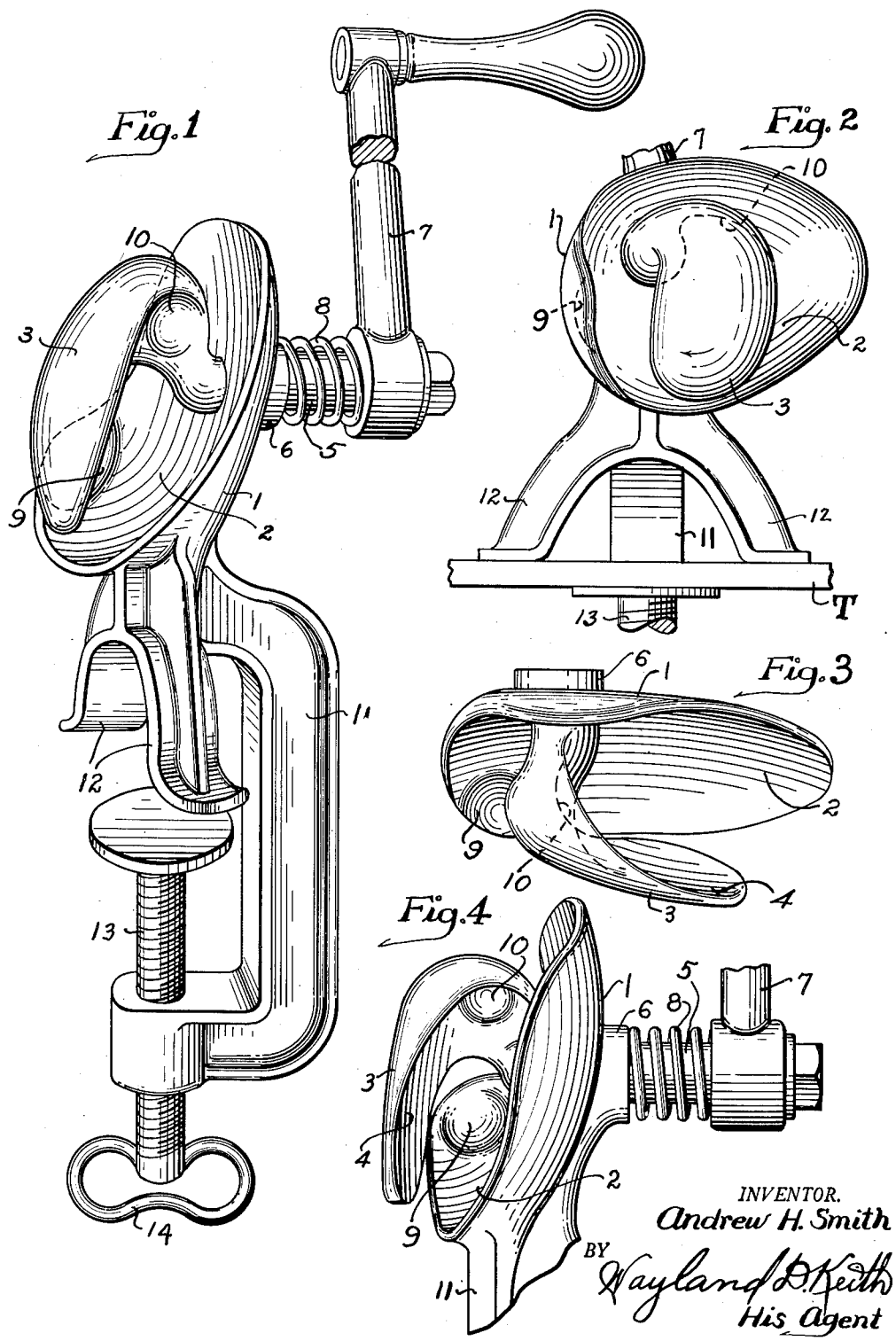
INVENTOR.
Andrew H. Smith
BY Wayland D. Keith
His Agent Patented Dec. 23, 1952

2,622,643

UNITED STATES PATENT OFFICE 2,622,643

NUTCRACKER

Andrew Hubert Smith, Glendale, Calif.

Application May 16, 1949, Serial No. 93,446

5 Claims. (Cl. 146—13)

This invention relates to improvements in nut crackers, and particularly for cracking the shells of pecans and other hard-shelled nuts for removing substantially whole nut meats therefrom.

Nut crackers as made heretofore generally are not capable of use on different sized nuts, and frequently cause a crushing of the nut rather than the mere cracking of the shell whereby the nut meats are broken and it is difficult to remove the whole nut meats therefrom.

One object of this invention is to provide a nut cracker that is adapted for use on nuts of different sizes and which will be effective in use for cracking the shells thereof without crushing or breaking the nut meats.

A further object of this invention is to improve the construction of nut crackers so as to apply a steady, even pressure to the nut shells, causing a cracking action thereon without causing a crushing action on the meat of the nut.

Another object of this invention is to improve the construction of nut crackers to provide for securely attaching the nut cracker to a working surface, and to hold it firmly in place.

Still another object of the invention is to provide a nut cracker that is sturdy in construction, easy to operate and to keep clean, and which is efficient for cracking the nut without crushing the nut meat.

These objects may be accomplished according to one embodiment of the invention by providing a cup-shaped receptacle or head adapted to receive the nut therein, within which a cracking member is operatively mounted and preferably provided with a spiral surface so that upon rotation of the spiral member a gradual cracking action will be applied to the shell of the nut which will not be sufficient to cause the cracking of the nut meat. If a nut is encountered which will not crack, a yielding action of the cracking member is provided to prevent breakage of the machine.

It is preferable that sockets be provided in the receptacle and cracking member in position to receive the ends of pecans and other elongated nuts to facilitate the horizontal cracking of the shell thereof.

This embodiment of the invention also preferably utilizes a C-clamp which may be attached to a table or other working surface as an effective and secure support for the nut cracker.

This embodiment of the invention is illustrated in the accompanying drawings in which:

Fig. 1 is a perspective view of a nut cracker embodying this invention;

Fig. 2 is a front elevation thereof, with parts broken away;

Fig. 3 is a top plan view of the cracker elements detached; and

Fig. 4 is a view at right angles thereto.

With more detailed reference to the drawings, a cracker head is designated generally by the numeral 1 and has a concave inner face 2 which is preferably cup-shaped or semi-spherical and is adapted to receive therein the nut to be cracked. This head forms an anvil member of the cracker.

A cracker member is designated generally by the numeral 3 and is constructed with a spiral face 4 arranged in opposed relation with the concave anvil portion 2 of the head 1. This spiral member 4 is mounted on a shaft 5 that extends transversely through the head 1 substantially on a horizontal axis in the embodiment illustrated, in which relation the head 1 is provided with an upright side wall and partial bottom wall to support the nut thereby.

The shaft 5 is slidably mounted in a bushing 6 in the head 1 and has a crank handle 7 secured to the outer end thereof, in the embodiment shown, for manual operation of the shaft and cracking member 3. A coiled spring 8 is telescoped over the shaft 5 between the bushing 6 and the handle 7, normally tending to hold the cracking member pressed toward the head 1 but yielding before breakage if a nut is encountered which will not crack, so as to apply, however, sufficient pressure to crack the shell preferably without crushing the nut meat.

It is preferable that the cup-shaped portion of the head be provided with a socket 9 in one side thereof in position to act in opposed relation with a complementary socket 10 formed in the base of the cracking member 3. These sockets 9 and 10 preferably are in the same vertical plane as will be apparent from Fig. 4, when the head is mounted in an upright position as shown. A nut, such as a pecan, may be placed in the cracker with its opposite sides or ends positioned in the sockets 9 and 10 and will be cracked therebetween by a partial rotation of the cracking head 3.

If the nut is not of the proper size and shape to be retained in the sockets 9 and 10, it may, nevertheless, be cracked preferably without crushing of the nut meat by fitting it between the spiral face 4 of the cracking head 3 and the concave seat 2 of the head 1. In such position, the rotation of the shaft 5 in a counter-clockwise direction, in Fig. 2, by the handle 7, will cause a gradual movement of the spiral surface 4 toward concave face 2 to produce a cracking action on the sides of the nut which preferably will not cause a crushing action on the nut meat. If undue pressure should be encountered because of the size and character of the nut which will not crack, the spring 8 will yield to prevent breaking the machine.

Upon reversing of the handle 7, the cracking member 3 will be moved way from the anvil member 2 to allow the nut to drop out of the machine.

While any suitable or desired form of support may be used, the invention is shown as mounted on a support adapted for securing the nut cracker to a table or other working surface, indicated generally at T, in Fig. 2. A C-clamp is designated generally at 11 and includes a pair of out-turned base members 12 adapted to rest on spaced portions of the table T in opposed relation to a threaded bolt 13 screw-threaded through the lower end portion of the C-clamp frame portion 11. The lower end of the bolt 13 has a butter-fly head 14 thereon for rotation of the bolt by hand into clamping relation with the table T.

With this nut cracker the greater portion of the nut meats come out whole, which is desirable but not generally possible with crackers in use heretofore.

The particular pertinent feature of the device is the complementary curvatures of the tongue and flange members, so as to receive, crack, release, and discharge the nut upon two easy simple movements of the handle.

Also, emphasis is placed on the contoured members for applying pressure to the nut, so that the exertion is not on the part of an operator but is brought about by the particular complementary portions of the curves being brought to bear on the nut.

While the invention has been illustrated and described in one embodiment, it is to be recognized that variations and changes may be made therein without departing from the invention except as specified in the claims.

I claim:

1. A nut cracker comprising a stationary anvil portion having an angularly disposed face with respect to a transverse axis passing therethrough, a shaft passing through said anvil portion, arranged transversely thereof and journaled therein on said axis and having a concave cracking member transversely fixed on said shaft, which concave cracking member has a spiral face thereon facing said angularly disposed face of said stationary anvil so when a nut is placed between said spiral face and said angularly disposed face said nut will be crushed as said face on said cracking member moves toward said angularly disposed face on said stationary anvil upon rotation of said cracking member in one direction, and means for rotating said shaft.

2. A nut cracker comprising a stationary anvil portion having a seat with a face thereof angularly disposed with respect to a transverse axis passing therethrough, a shaft passing through said anvil portion and arranged transversely thereto and journaled on said axis, a concave cracking member transversely fixed on said shaft, which concave cracking member has a spiral face thereon positioned to face said angularly disposed face of said stationary anvil, said concave cracking member also having a seat formed therein in opposed relation to and facing said seat on said anvil portion so a nut, when placed between said spiral face and said angularly disposed face will be crushed when said spiral face on said cracking member moves toward said angularly disposed face on said stationary anvil, upon rotation of said cracking member by the rotation of said shaft, and means for rotating said shaft.

3. A nut cracker comprising a stationary anvil portion having a concave seat and an angularly disposed face with respect to a transverse axis passing therethrough, a shaft passing through said anvil portion transversely thereof and journaled on said axis, a concave cracking member transversely fixed on said shaft, which concave cracking member has a spiral face thereon so disposed as to face said angularly disposed face of said stationary anvil, said concave cracking member also having a concave seat formed therein in opposed relation to and facing said concave seat of said anvil, so a nut, placed between said spiral face on said cracking member and said angularly disposed face on said stationary anvil, will be crushed with a twisting motion, when said cracking member is moved toward said stationary anvil upon rotation of said cracking member by the rotation of said shaft, and means for rotating said shaft.

4. A nut cracker comprising a stationary, concave, clam-shell shaped anvil portion, which anvil portion has an angularly disposed face with respect to a transverse axis passing therethrough, a shaft passing through said anvil portion transversely thereof and journaled therein on said axis, a concave cracking member disposed transversely of said shaft and fixed thereto, which concave cracking member has a spiral face thereon in position to face said angularly disposed face of said stationary anvil, so a nut, when placed between said face on said stationary anvil and said spiral face on said cracking member, will be crushed by a twisting action thereupon, when said cracking member is moved toward said stationary anvil, upon rotation of said cracking member by rotation of said shaft, and means for rotating said shaft.

5. A nut cracker comprising a stationary, concave, clam-shell shaped anvil portion, which anvil portion has an angularly disposed face with respect to a transverse axis passing therethrough, a shaft passing through said anvil portion transversely thereof and journaled therein on said axis, a concave cracking member positioned transversely of said shaft and fixed thereto, which concave cracking member has a spiral face thereon in position to face said angularly disposed face of said stationary anvil, so a nut, when placed between said angularly disposed face of said stationary anvil and said spiral face of said cracking member, will be cracked by a twisting action thereon, upon movement of said cracking member converging toward said angularly disposed face of said stationary anvil upon rotation of said cracking member in one direction by rotation of said shaft, means for rotating said shaft, a coiled spring sleeved over said shaft between said stationary anvil and said means for rotating said shaft so as to urge said concave cracking member toward said concave clam-shell shaped anvil, and said shaft having a space thereon intermediate said means for rotating said shaft and said anvil, to permit longitudinal movement of said shaft upon compression of said spring.

ANDREW HUBERT SMITH.

REFERENCES CITED

The following references are of record in the file of this patent:

UNITED STATES PATENTS

| Number | Name | Date |
|---|---|---|
| 788,599 | Rochlitz | May 2, 1905 |
| 1,380,023 | Roussillon | May 31, 1921 |
| 2,054,038 | Mantelet | Sept. 8, 1936 |
| 2,226,272 | Wadsworth | Dec. 24, 1940 |
| 2,481,201 | Collier | Sept. 6, 1949 |

FOREIGN PATENTS

| Number | Country | Date |
|---|---|---|
| 16,829 | Great Britain | July 22, 1913 |
| 260,352 | Germany | May 24, 1913 |
| 18,396 | Netherlands | July 16, 1928 |